Figure 1:
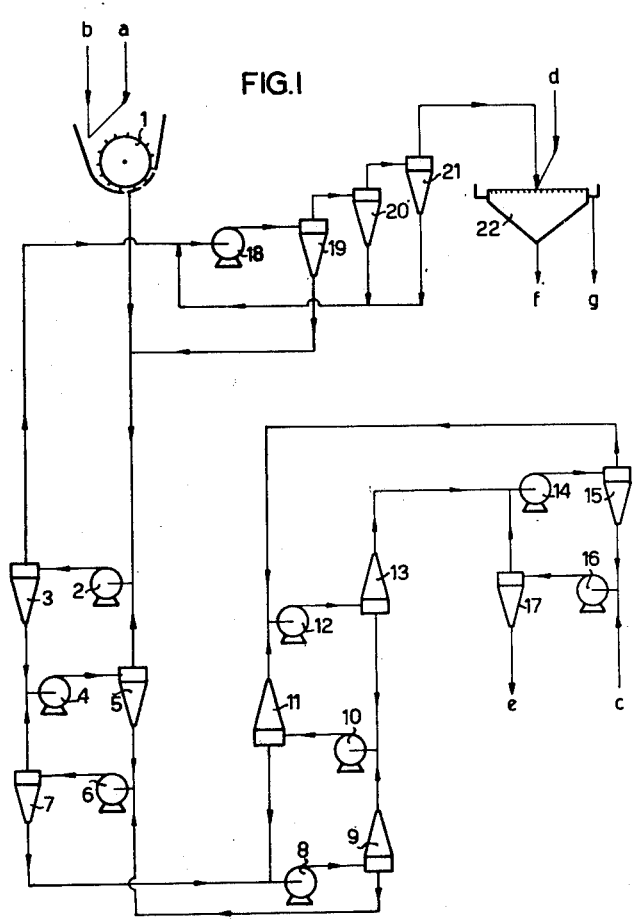

July 2, 1957     F. J. FONTEIN ET AL     2,798,011
PROCESS OF MANUFACTURING STARCH AND BY-PRODUCTS
FROM TUBERS BY COUNTERCURRENT
HYDROCYCLONE SEPARATION Filed May 13, 1953     2 Sheets-Sheet 1

Inventors
Freerk J. Fontein +
Cornelis Dijksman

By Cushman, Darby + Cushman
Attorneys

United States Patent Office 2,798,011
Patented July 2, 1957

2,798,011

PROCESS OF MANUFACTURING STARCH AND BY-PRODUCTS FROM TUBERS BY COUNTER-CURRENT HYDROCYCLONE SEPARATION

Freerk J. Fontein and Cornelis Dijksman, Heerlen, Netherlands, assignors to Stamicarbon N. V., Heerlen, Netherlands Application May 13, 1953, Serial No. 354,748

Claims priority, application Netherlands May 21, 1952

4 Claims. (Cl. 127—66)

The present invention relates to manufacturing starch and by-products from starch-rich and wastewater containing natural products such as potatoes and cassava roots or coarse cuttings thereof. The wastewater comprises primarily a water solution of soluble proteins, acids, and various inorganic salts.

Hitherto the raw product is first rasped coarsely and the resulting paste is then screened at a mesh of about 0.35 mm. with addition of much water, which may contain disinfectants and flocculation agents. Coarse peel and cellwall particles and unbroken cells are left on the screen and are rasped one or two further times. After each rasping the paste is screened with addition of much water so as to remove the free starch particles as completely as possible from the waste. The material remaining on the last screen contains insufficient starch to justify further treatment and this material serves for instance as cattle food.

The throughfall of the screens contains most of the starch and wastewater of the raw product and further fine cellwall particles and much water. This suspension is then thickened by means of settling tanks or centrifuges. The overflow from the thickeners contains most of the wastewater of the raw product and further some cellwall particles and starch. This overflow is too diluted for further treatment and consequently goes to waste. The underflow from the thickeners contains starch and contaminations and is treated on screens and on starch tables or in centrifuges for obtaining a purified starch fraction.

In this old process starch is lost in the fraction remaining on the screen after the last rasp and in the overflow from the thickeners. No use is made of the wastewater.

Now it is the object of this invention to provide an improved process for manufacturing starch and by-products from natural products such as potatoes and cassava roots or coarse cuttings thereof. Particular objects of this invention are to increase the yield of starch, to increase the yield of by-products and to decrease the quantity of water used in the process. It is a further object of the invention to prepare starch of better quality.

These and other objects are attained, according to the invention, by comminuting or triturating the raw product in but a single step wherein substantially all starch particles are freed. In this step only a small quantity of liquid is required so that a concentrated paste is obtained. This paste is then treated in a number of separating steps according to the countercurrent system, cleaned starch being obtained from the last separating step and a concentrated fraction of wastewater and cellwalls from the first separating step. Washing liquid is added at the last separating step, but only in a small quantity. In this new process only a small amount of liquid is used so that the wastewater and cellwalls are in a concentrated form. The wastewater contains protein which can be recovered from this fraction and recovery of the cellwalls is also easily practicable.

In the comminuting step the starch particles must be freed. To this end comminuted material should not contain particles larger than 0.17 mm. and the particles should preferably be not larger than 0.15 mm. To this end use can be made for instance of the rasp described in German patent specification No. 188,153. In that rasp the raw product is rasped through a screen. For effecting the process according to the present invention I prefer such a rasp to be provided with a screen with slit like apertures having a width of at least 0.1 mm. but preferably 0.12 mm. The quantity of water added in the comminuting step should be relatively small and preferably the comminuted material should have a specific gravity of at least 1.05.

The total amount of water added in the comminuting step in the subsequent separation preferably should be so adjusted that the concentration of protein in the feed to the first separating step is at least ¼ of the concentration of the protein in the wastewater of the raw product.

One of the difficulties met in the potato starch industry is that often great quantities of froth are produced which are difficult to handle. The quantity of froth depends on the concentration of the wastewater in the process and on the detention time of the wastewater in the process. Since according to the present invention the wastewater concentration is high, measures should be taken to prevent production of too much froth. One way to fight production of froth is to prevent air from coming into contact with the suspension, and another way is to reduce the detention time of the material in the process as much as possible. This last measure is also important for obtaining starch of good quality. It is therefore preferred to effect the separation of the comminuted material in a number of the multiple hydrocyclones which are arranged in series with pumps interposed. The fraction of quickly settling particles withdrawn from each multiple hydrocyclone, the starch fraction, is then fed to the multiple hydrocyclone of the following step and the fraction of slowly settling particles is returned to the preceding step. Water is added before the last step, from which cleaned starch is withdrawn and the contaminations are withdrawn from the first step and are processed to yield by-products.

The quantity of water added before the last separating step should preferably be in the range between 0.6 and 1 m.³ of fresh liquid per metric ton of raw product. The quantity of the fraction returned from the last multiple hydrocyclone to the preceding one should preferably be at most 75% and at least 50% of the feed to the last multiple hydrocyclone.

The novel features of this invention will be understood and more fully appreciated from the following description, particularly when considered in connection with the accompanying drawings.

Figure 2:
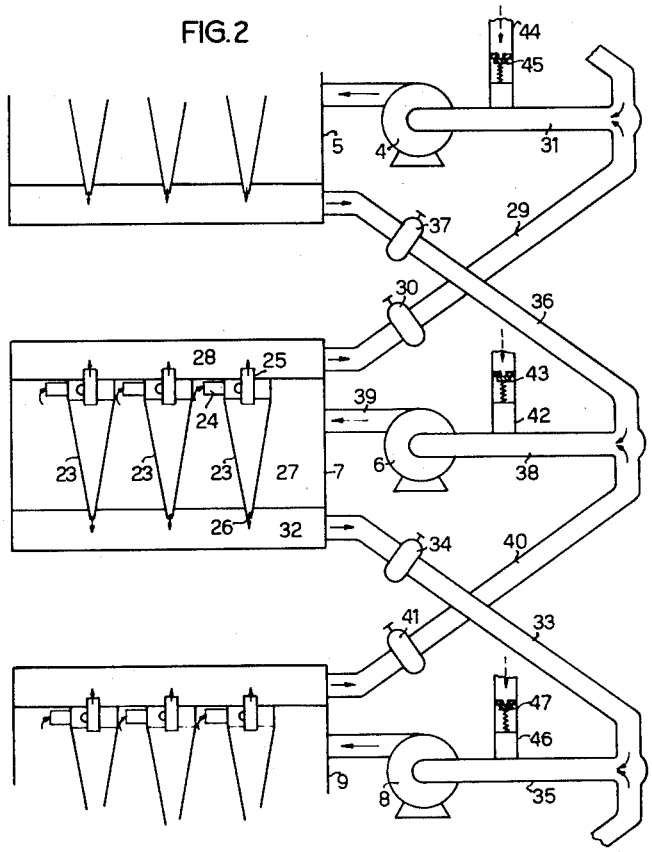

In the drawings, Figure 1 is a diagram of part of a potato starch factory. Figure 2 is a diagram of a detail in Figure 1.

In Figure 1, 1 indicates a rasp of the type described in the German patent specification No. 188,153. 2, 4, 6, 8, 10, 12, 14, 16, and 18 are booster pumps, 3, 5, 7, 9, 11, 13, 15, 17, 19, 20 and 21 are multiple hydrocyclones and 22 is a thickener. The various apparatus are connected by means of closed conduits.

Washed potatoes are introduced at $a$ water containing a disinfectant at $b$, a flocculation agent at $d$ and water at $c$. A purified starch suspension is removed at $e$, the by-products at $f$ and waste water at $g$.

The multiple hydrocyclones 9, 11 and 13 are shown with their apices pointing up, in contradistinction to the other multiple hydrocyclones. This is done only with a view to keeping the drawing simple and avoiding intersection of lines as much as possible, for there is not the least essential difference between the multiple hydrocyclones 9, 11 and 13 and the multiple hydrocyclones 3, 5, 7, 15 and 17. Figure 2 shows multiple hydrocyclone 7, part of multiple hydrocyclone 5 and of multiple hydrocyclone 9, the pumps 4, 6 and 8 and the associated pipes. The multiple hydrocyclones are highly schematized in the drawing; various types of constructions of multiple hydrocyclones are known or included in other patent applications.

In multiple hydrocyclone 7 a number of hydrocyclones 23 with feed conduits 24, vortex finders 25 and discharge apertures 26 are represented. The hydrocyclones 23 are fed from the feed chamber 27. The vortex finders 25 debouch into the overflow chamber 28, from where pipe 29 with regulating valve 30 leads to pump 4 via pipe 31. The discharge apertures 26 debouch into a discharge chamber 32 from where a pipe 33 with regulating valve 34 leads to pump 8 via pipe 35.

The multiple hydrocyclones 5 and 9 and also the multiple hydrocyclones 3, 11, 13, 15 and 17 (Figure 1) are of the same type as multiple hydrocyclone 7; however it is not essential that they are exactly alike.

Pipe 36, provided with regulating valve 37, leads, via pipe 38, to pump 6, which feeds multiple hydrocyclone 7 via pipe 39. Pipe 40, provided with regulating valve 41, runs from the overflow chamber of the multiple hydrocyclone 9 to pipe 38.

Furthermore a water conduit 42 debouches into pipe 38, which conduit is provided with a back pressure valve 43. Water conduit 44, provided with back pressure valve 45 debouches into pipe 31 and water conduit 46, provided with back pressure valve 47, debouches into pipe 35. For the other pumps there are also such water conduits with back pressure valves. Under normal conditions no water flows through these water conduits, but whenever the pressure of a pump drops below the desirable value the back pressure valve opens so that a flow of water is admitted. The multiple hydrocyclones 19, 20 and 21 are connected direct in series, without interposed pumps.

When the apparatus is in operation, washed potatoes $a$ with a small amount of water $b$ in which a disinfectant is dissolved, are introduced into rasp 1 and rasped very fine therein so that practically all the starch is liberated. To this end the rasp is provided with fine screening gauze.

The raspings from rasp 1, which have a high protein content, are supplied to pump 2 through a closed conduit, to which pump also the overflow fraction from multiple hydrocyclone 5 and the discharge fraction from multiple hydrocyclone 19 are led. Pump 2 pumps the mixture through multiple hydrocyclone 3. The pressure applied in this pumping process and the dimensions of the hydroclones of multiple hydroclone 3 and also the pressures in the overflow and discharge chambers of multiple hydroclone 3 are chosen such that the mixture is separated into a concentrated starch suspension, which leaves the hydrocyclones through the discharge apertures, and a suspension poor in starch leaving through the overflow apertures. The discharge fraction contains the greater part of the starch, whereas the greater part of the liquid, and hence of the materials dissolved therein, gets into the overflow fraction. Also a large part of the cellwalls and the other components of the potato which are poor in starch get into the overflow fraction in this treatment.

The discharge fraction from multiple hydrocyclone 3 is supplied to pump 4 through a closed conduit, to which pump also the overflow fraction from multiple hydrocyclone 7 is led via a closed conduit. This mixture, which in all respects is purer than the feed of multiple hydrocyclone 3, is pumped to multiple hydrocyclone 5 by pump 4. In this multiple hydrocyclone a separation similar to that in multiple hydrocyclone 3 takes place. In the same way the discharge fractions of each of the multiple hydrocyclones 5, 7, 9, 11 and 13 together with the overflow fractions from the multiple hydrocyclones 9, 11, 13, 15 and 17 respectively are led to the pumps 6, 8, 10, 12 and 14 respectively. The discharge fraction from multiple hydrocyclone 15, together with the fresh water supplied at $c$, is pumped through multiple hydrocyclone 17 by pump 16. By the successive treatments in the multiple hydrocyclones 3, 5, 7, 9, 11, 13, 15 and 17 the discharge fraction becomes gradually poorer in dissolved components and cellwalls so that eventually a purified starch suspension is obtained at $e$.

The overflow fraction from multiple hydrocyclone 3 contains all the dissolved components and cellwalls of the potatoes supplied, with the exception of the extremely small amount leaving the system at $e$. Besides, this fraction contains a small amount of starch because of which it is passed on to pump 18 through a closed conduit, which pump passes this fraction through the multiple hydrocyclones 19, 20 and 21, arranged in series. The hydrocyclones of these multiple hydrocyclones may be smaller than the hydrocyclones of the multiple hydrocyclones 3, 5, 7, 9, 11, 13, 15 and 17, as the suspension to be separated in the multiple hydrocyclones 19, 20 and 21 contains less solid matter.

The discharge fraction from multiple hydrocyclone 19 is passed on to multiple hydrocyclone 3, so that the starch may be recovered from this fraction.

The overflow fraction from multiple hydrocyclone 19 is supplied to multiple hydrocyclone 20 and the overflow fraction from the same multiple hydrocyclone to multiple hydrocyclone 21. The discharge fractions from the multiple hydrocyclones 20 and 21 are returned to pump 18, so as to make possible recovery of the starch contained in these fractions. The overflow fraction from multiple hydrocyclone 21 contains the very finest starch particles, the protein and the cell particles. This fraction is supplied to thickener 22. On account of the fact that only little water was supplied at $b$ and $c$, while also through the back pressure valves only little water enters the system, the supply to thickener 22 has a high concentration of cellwalls and protein. By adding known flocculation agents at $d$ these components may be concentrated and separated off at $f$. Finally the waste water is drained at $g$.

As all of the liquid is passed through closed conduits and hence is not exposed to the air, the formation of froth need not be feared. Moreover, the detention time of the liquid in the system is only short, which lessens the danger of infection and reduces the application of disinfectants. To further reduce occurrence of froth, a de-aeration installation may be installed between the rasp and the first separation step.

The performance of the multiple hydrocyclones is controlled with the help of the regulating valves in the delivery conduits. The best purification is obtained with a large overflow fraction and a small discharge fraction; however, in that case much starch is recycled. A suitable adjustment does not present difficulties, however.

The water conduits with the back pressure valves serve to balance the system. For, whenever the underpressure becomes too high for a certain pump, a flow of water is admitted through the water conduit. The amount of water supplied in this way is relatively small. It is however also possible to balance the system without using such back pressure valves or similar devices.

If desired, back pressure valves may also be provided in the other conduits, while moreover manometers and plugs for drawing samples are desirable. These are not indicated in the drawings, however.

*Example*

In a potato starch factory according to Figure 1 an amount of 30 tons of washed potatoes are rasped per hour under addition of 11 m.$^3$ of water. The rasp is provided with a screen having a mesh of 0.12×2 mm.

The raspings contain 200 kg. of free starch per ton of potatoes, this is 6 tons of starch per hour.

The hydrocyclones of the multiple hydrocyclones numbers 3, 5, 7, 9, 11, 13, 15, 17 have the following dimensions.

| | |
|---|---|
| Diameter cylindrical section_____mm__ | 15 |
| Height cylindrical section_____mm__ | 7 |
| Diameter feed aperture_____mm__ | 3½ |
| Diameter vortex finder_____mm__ | 3½ |
| Length vortex finder inside hydrocyclone____mm__ | 7 |
| Diameter discharge aperture_____mm__ | 3½ |
| Apex angle_____degrees__ | 10 |

The hydrocyclones of the multiple hydrocyclones numbers 19, 20 and 21 have the following dimensions:

| | |
|---|---|
| Diameter cylindrical section_____mm__ | 10 |
| Height cylindrical section_____mm__ | 5 |
| Diameter feed aperture_____mm__ | 2½ |
| Diameter vortex finder_____mm__ | 2½ |
| Length vortex finder inside hydrocyclone____mm__ | 5 |
| Diameter discharge aperture_____mm__ | 2½ |
| Apex angle_____degrees__ | 7½ |

The feed pressure of the multiple hydrocyclones 3, 5, 7, 9, 11, 13, 15 and 17 is about 4 atmospheres gauge pressure, the back pressure on the discharge apertures 0 atmosphere gauge pressure.

The feed pressure of multiple hydrocyclone 19 amounts to 7 atmospheres gauge pressure, the back pressures on the discharge apertures of the multiple hydrocyclones 19, 20 and 21 are 5, 3, and 0 atmosphere gauge pressure respectively, the back pressure on the overflow aperture of multiple hydrocyclone 21 being also 0 atmosphere gauge pressure.

The results are as follows:

| Multiple hydrocyclone No. (Fig. 1) | Number of Hydrocyclones | Overflow fraction | | Discharge fraction | |
|---|---|---|---|---|---|
| | | m.³/hour | Metric tons of Starch/hr. | m.³/hour | Metric tons of Starch/hr. |
| 3_____ | 480 | 55.6 | 0.75 | 16.3 | 6.75 |
| 5_____ | 296 | 28 | 0.75 | 16.3 | 6.75 |
| 7_____ | 296 | 28 | 0.75 | 16.3 | 6.75 |
| 9_____ | 296 | 28 | 0.75 | 16.3 | 6.75 |
| 11_____ | 296 | 28 | 0.75 | 16.3 | 6.75 |
| 13_____ | 296 | 28 | 0.75 | 16.3 | 6.75 |
| 15_____ | 294 | 28 | 0.75 | 16.0 | 6.66 |
| 17_____ | 282 | 27.8 | 0.66 | 14.5 | 6.00 |
| 19_____ | 326 | | | 4.8 | 0.75 |
| 20_____ | 302 | | | 9.6 | 0.15 |
| 21_____ | 278 | 50.8 | 0.00 | | |

The discharge fraction $e$ from multiple hydrocyclone 17 contains only few cell particles. The protein in this fraction amounts to $\frac{1}{1620}$ of the protein content of the wastewater of the potatoes.

The protein content of the fraction supplied to thickener 22, this is the overflow fraction from multiple hydrocyclone 21, is 0.4 of the protein content of the wastewater of the potatoes. From this fraction the by-products may be recovered in a simple manner known in itself.

We claim:

1. A process for manufacturing starch and by-products from tubers, comprising the steps of comminuting tubers in a single step to a particle size not exceeding 0.17 mm. with the addition of liquid, treating the comminuted product in a countercurrent hydrocyclone system, withdrawing a starch poor fraction from the first stage thereof, withdrawing a by-product free and starch rich fraction from the final stage thereof, and feeding wash liquid to the said final stage, wherein the total amount of liquid added is restricted to effect a soluble protein concentration to the said first stage of at least 25% of the corresponding concentration in the waste-water of the raw product.

2. A process according to claim 1, wherein the liquid added in the comminuting step is restricted to effect a specific gravity in the comminuted product of at least 1.05.

3. A process according to claim 1, wherein starch is separated from the starch poor fraction yielded by the first separation step and recycled to the first separation step.

4. A process according to claim 1, wherein the quantity of wash liquid fed to the final separation step is within the range of from 0.6 m.³ to 1.0 m.³ per metric ton of raw product, and the volume of starch poor fraction fed back from the final separation step to the preceding separation step is between 50 and 75% of that of the feed to the final separation step.

References Cited in the file of this patent

UNITED STATES PATENTS

| | | |
|---|---|---|
| 757,778 | Schroder _____ | Apr. 19, 1904 |
| 1,681,118 | Jaschke _____ | Aug. 14, 1928 |
| 2,084,250 | Fritze _____ | June 15, 1937 |
| 2,443,897 | Dexter et al. _____ | June 22, 1948 |

FOREIGN PATENTS

| | | |
|---|---|---|
| 682,527 | Great Britain _____ | Nov. 12, 1952 |